J. FAIRMAN.
PIANO ATTACHMENT.
No. 7,750. Reissued June 19, 1877.
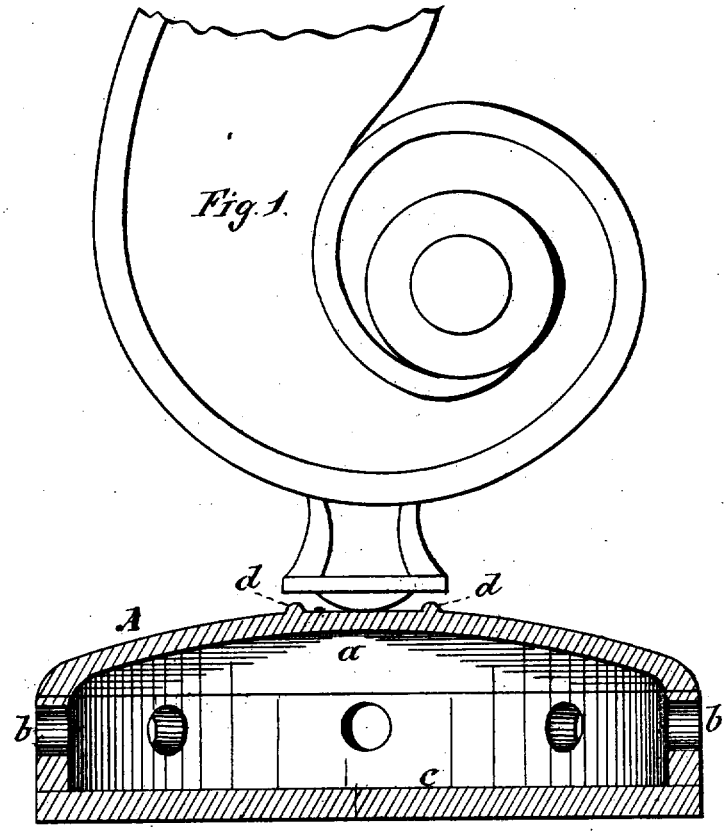
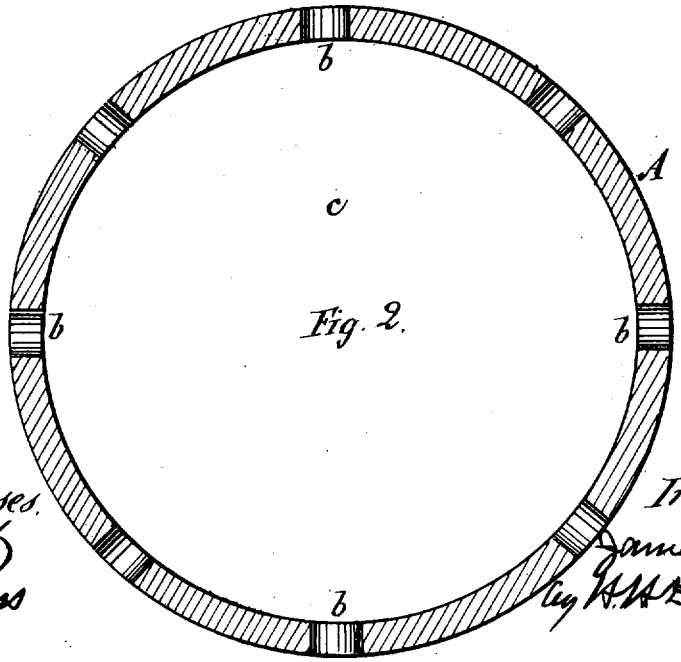
Witnesses.
Mary Oth
H. H. Bliss
Inventor
James Fairman
by H. A. Doubleday
N. PETERS, PHOTO-LITHOGRAPHER, WASHINGTON, D. C.

UNITED STATES PATENT OFFICE.

JAMES FAIRMAN, OF NEW YORK, N. Y.

IMPROVEMENT IN PIANO ATTACHMENTS.

Specification forming part of Letters Patent No. 189,441, dated April 10, 1877; reissue No. 7,750, dated June 19, 1877; application filed May 14, 1877.

*To all whom it may concern:*

Be it known that I, JAMES FAIRMAN, of New York, in the county of New York and State of New York, have invented certain new and useful Improvements in Hollow Supports for Pianos; and I do hereby declare that the following is a full, clear, and exact description thereof that will enable others skilled in the art to which it appertains to make and use the same, reference being had to the accompanying drawings, and to the letters of reference marked thereon, which form a part of this specification.

Figure 1 represents a vertical section. Fig. 2 is a horizontal section.

My invention consists in a support for each leg of a piano, constructed in the form of a thin shell of wood, as hereinafter described, whereby such leg is mounted upon an elastic, vibrating, resonant chamber, the caster in the leg resting upon the central portion of the shell.

In the drawing the letter A designates my hollow or bridged support, which is made of wood, metal, or any other material suitable for the purpose. The support which I have represented in the drawing is made circular, and it is provided with an arched top, *a*, a perforated rim, *b*, and a bottom, *c*. Said support may, however, be made square, oblong, or of any other suitable shape or form, and the rim *b* may either be made to extend clear round, or it may be partly cut away, and the bottom *c* may be omitted entirely.

My support may be placed either directly upon the floor, for the leg of the piano to rest upon, as shown in the drawing, or it may be inserted between each leg and the case of the piano-forte.

When it is to be used on the floor beneath each leg, I prefer to form on the top a circular bead, *d*, whereby a recess is obtained, into which the caster of the leg can be placed, the weight of the piano being supported directly upon the casters, which in turn rest upon the top *a*, the bead *d* insuring that the caster shall not roll off. Or I may form a central depression in the top for the same purpose. But I do not wish to be limited to such constructions, as they are not essential, and form no part of my invention, broadly considered.

It is a well-known fact that the vibrations of the strings of a piano-forte are communicated to the case and to the legs, and if these legs are supported by a hard, rigid floor, or by a carpet, such vibrations are suddenly stopped, and the volume of the tone of the instrument is reduced. This defect is remedied by my invention, since by means of my hollow bridged supports the vibration is sustained and the tone continued.

I do not claim broadly "insulating" a piano by means of firm, unyielding supports placed between the legs and the floor, that being an old device, but in such earlier construction the outer edge of the leg rested upon the outer rim or wall of the block, this outer edge being vertical to and solid with the flange which rests upon the floor, and without any horizontal hollow air-space intervening between the bearing portion of the leg and the floor; whereas in my construction the weight of the piano is supported upon a thin, elastic, vibrating shell of wood, with a hollow space immediately below the caster-wheel in the piano-leg; and this change results in the introduction of an entirely new mode of operation, as follows:

In the earlier construction there is a continuous solid connection in a vertical plane between the floor and every part of the leg which rests upon the insulator, and the device is formed of a solid heavy block of material, with the exception of a small central portion, which is reduced in thickness, but is entirely surrounded at its edge by a heavy flange or rim, and could not be made to serve the purpose of a sounding-board; whereas in my construction I support the caster upon a thin sheet of wood, with the grain running horizontally, and supported at its outer edge only, in substantially the same manner as the bridge of a violin is supported upon the body, between the sounding-posts, or between the sounding-post and the rim of the body, whereby I render available the elasticity of a thin sheet of wood, when supported at both ends and deflected in a direction perpendicular to the line of its fiber; and also convert the shell into a resonant chamber, a result which cannot be accomplished in the earlier construction referred to.

What I claim is—

1. An independent support for each leg of a piano, consisting of a resonant shell or chamber, constructed with a thin horizontal sheet, upon which the leg is supported centrally, said sheet being supported at its outer edge in such manner as to form an air-chamber immediately below that part upon which the caster rests.

2. A support for a leg of a piano-forte, consisting of a hollow block with an arched top, and a perforated rim, substantially as set forth.

3. A support for a leg of a piano-forte, made with an arched top, a perforated or partly-open rim, and a projecting circular bead on its top, substantially as set forth.

In testimony that I claim the foregoing I have hereunto set my hand this 11th day of May, 1877.

JAMES FAIRMAN.

Witnesses:
H. H. DOUBLEDAY,
JNO. D. PATTEN.